(12) United States Patent
Shveidel et al.

(10) Patent No.: US 11,709,626 B2
(45) Date of Patent: Jul. 25, 2023

(54) SCHEDULING STORAGE SYSTEM TASKS TO PROMOTE LOW LATENCY AND SUSTAINABILITY

(71) Applicant: EMC IP Holding Company LLC, Hopkinton, MA (US)

(72) Inventors: Vladimir Shveidel, Pardes-Hana (IL); Ronen Gazit, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/148,872

(22) Filed: Jan. 14, 2021

(65) Prior Publication Data
US 2022/0222013 A1 Jul. 14, 2022

(51) Int. Cl.
G06F 3/06 (2006.01)

(52) U.S. Cl.
CPC .......... *G06F 3/0659* (2013.01); *G06F 3/0611* (2013.01); *G06F 3/0673* (2013.01)

(58) Field of Classification Search
CPC ..... G06F 3/0659; G06F 3/0611; G06F 3/0673
See application file for complete search history.

(56) References Cited

U.S. PATENT DOCUMENTS

| | | | |
|---|---|---|---|
| 8,327,103 B1 | 12/2012 | Can et al. | |
| 10,671,453 B1 | 6/2020 | Kamran et al. | |
| 10,678,480 B1 | 6/2020 | Armangau et al. | |
| 10,817,220 B2 | 10/2020 | Bono et al. | |
| 11,005,970 B2 | 5/2021 | Kamran et al. | |
| 2004/0205166 A1* | 10/2004 | DeMoney | G06F 3/061 709/219 |
| 2014/0282018 A1* | 9/2014 | Amble | G16H 40/63 715/733 |
| 2015/0242133 A1* | 8/2015 | Smith | G06F 3/0632 711/114 |
| 2015/0348327 A1* | 12/2015 | Zalewski | H04M 1/05 345/419 |
| 2018/0004456 A1* | 1/2018 | Talwar | G06F 3/0611 |
| 2019/0043593 A1* | 2/2019 | Guo | G06F 3/06 |
| 2020/0201792 A1* | 6/2020 | Stankevichus | G06F 13/1668 |
| 2021/0117238 A1 | 4/2021 | Shveidel et al. | |

OTHER PUBLICATIONS

Kamran, Lior, et al.; "Techniques for Scheduling Between Applications on a Core," U.S. Appl. No. 17/074,951, filed Oct. 20, 2020.
Kamran, Lior, et al.; "Managing Input/Output-Critical Tasks and Background Tasks Within a Computer Device," U.S. Appl. No. 17/029,646, filed Sep. 23, 2020.

* cited by examiner

*Primary Examiner* — Tracy A Warren
(74) *Attorney, Agent, or Firm* — BainwoodHuang

(57) ABSTRACT

A technique for scheduling access to a resource arranges tasks into multiple classes, where each class has a respective share and a respective priority. The share of a class sets an amount of access allocated to the class, and the priority sets an order in which the class can use its share, with higher priority classes getting access before lower-priority classes. The technique assigns latency-critical tasks, such as synchronous I/O tasks, to a first class having the highest priority and assigns bandwidth-critical tasks, such as background I/O processing, to a second class having a lower priority.

18 Claims, 4 Drawing Sheets

SCHEDULING STORAGE SYSTEM TASKS TO PROMOTE LOW LATENCY AND SUSTAINABILITY

BACKGROUND

Data storage systems are arrangements of hardware and software in which storage processors are coupled to arrays of non-volatile storage devices, such as magnetic disk drives, electronic flash drives, and/or optical drives. The storage processors service storage requests, arriving from host machines ("hosts"), which specify blocks, files, and/or other data elements to be written, read, created, deleted, and so forth. Software running on the storage processors manages incoming storage requests and performs various data processing tasks to organize and secure the data elements on the non-volatile storage devices.

Storage systems typically perform a diverse range of activities. These may include servicing I/O (input/output) requests arriving from hosts and performing various background processing. Servicing of I/O requests generally takes priority over background activity, as storage systems typically have latency targets for responding to I/O requests. For example, meeting these targets may involve quickly providing data in response to read requests and quickly persisting and acknowledging data in response to write requests. While not having the same urgency as host I/O requests, background activities are nevertheless important to maintain. If a system falls too far behind in its background processing, it may eventually lose its ability to store new data, causing it to fail to meet its latency targets as well as other requirements.

Prior scheduling approaches have aimed to strike a balance between I/O processing and background processing. One such approach monitors latency of I/O requests and increases the priority of I/O processing if latency gets too large. When latency targets are being achieved, however, the priority of I/O processing may be reduced, enabling background processing to use a larger share of resources.

SUMMARY

Unfortunately, the above-described scheduling approach involves deficiencies. For example, high latency of I/O requests can be caused by other things besides background processing taking too large a share of resources. Consider a case where many I/O requests are directed to the same address range during a short time interval. If a first writer takes a lock on the address range to complete its write, then later-arriving writers and readers may have to wait in line until the lock is released. Such later writers may then take their own locks, delaying the writers and readers behind them. In this scenario, I/O latency is increased, but not because of too much background processing. Indeed, increasing the priority of I/O processing relative to background processing in this example does nothing to reduce latency. It does tend to starve out background processing, however. For reasons like this, it is not uncommon for storage systems to have a considerable amount of free resources that go unutilized, even though there are urgent activities queued and ready to be run. Thus, what is needed is a more efficient scheduling approach.

This need is addressed at least in part by an improved technique for scheduling access to a resource. The technique arranges tasks into multiple classes, where each class has a respective share and a respective priority. The share of a class sets an amount of access allocated to the class, and the priority sets an order in which the class can use its share, with higher priority classes getting access before lower-priority classes. The technique assigns latency-critical tasks, such as synchronous I/O tasks, to a first class having the highest priority and assigns bandwidth-critical tasks, such as background I/O processing, to a second class having a lower priority.

Advantageously, latency-critical tasks are processed first, helping to ensure that latency targets are met. Also, bandwidth-critical tasks still get a share of access to the resource, avoiding starvation.

Certain embodiments are directed to a method of scheduling tasks to be run on a computing resource in a data storage system. The method includes arranging tasks into multiple classes, the classes having respective shares and respective priorities, and assigning latency-critical tasks to a first class and bandwidth-critical tasks to a second class. The method further includes running tasks by the computing resource in priority order, with the latency-critical tasks of the first class running before the bandwidth critical tasks of the second class, and with the first class and the second class each allocated access to the computing resource in accordance with their respective shares.

In some examples, the latency-critical tasks assigned to the first class include I/O request tasks for receiving and responding to I/O requests, and bandwidth-critical tasks assigned to the second class include background I/O tasks for incorporating data received in I/O write requests into persistent storage structures.

In some examples, the method further includes running multiple scheduling cycles in succession, with the first class and the second class allocated access to the computing resource in accordance with their respective shares within the scheduling cycles.

In some examples, the classes further include a third class for additional background tasks, the third class having a lowest priority.

According to some examples, the shares of the first class and the shares of the second class together account for 100% of a scheduling cycle, with a share of the third class being zero.

In some examples, tasks in the third class are run in response to both the first class and the second class having no tasks ready to be run.

In some examples, the share of the second class is provided as an adjustable parameter, with the share of the first class being dependent upon the share of the second class. According to some examples, the share of no other class besides the second class is an adjustable parameter.

In some examples, the method further includes monitoring progress of tasks in the second class and changing the share of the second class in response to detecting that the progress differs from a target level. In some examples, decreases in the share of the second class require greater changes in progress than do increases in the share of the second class. In some examples, changes in the share of the second class are rate-limited.

In some examples, a lower-priority class exceeds its allocated share within a scheduling cycle in response to no higher-priority class having any tasks ready to be run.

In some examples, the act of scheduling tasks is itself a task and is assigned to the second class.

Other embodiments are directed to a computerized apparatus constructed and arranged to perform a method of scheduling tasks to be run on a computing resource, such as the method described above. Still other embodiments are directed to a computer program product. The computer program product stores instructions which, when executed on control circuitry of a computerized apparatus, cause the computerized apparatus to perform a method of scheduling tasks to be run on a computing resource, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

DETAILED DESCRIPTION

Embodiments of the improved technique will now be described. One should appreciate that such embodiments are provided by way of example to illustrate certain features and principles but are not intended to be limiting.

An improved technique for scheduling access to a resource arranges tasks into multiple classes, where each class has a respective share and a respective priority. The share of a class sets an amount of access allocated to the class, and the priority sets an order in which the class can use its share, with higher priority classes getting access before lower-priority classes. The technique assigns latency-critical tasks, such as synchronous I/O tasks, to a first class having the highest priority and assigns bandwidth-critical tasks, such as background I/O processing, to a second class having a lower priority.

Figure 1:
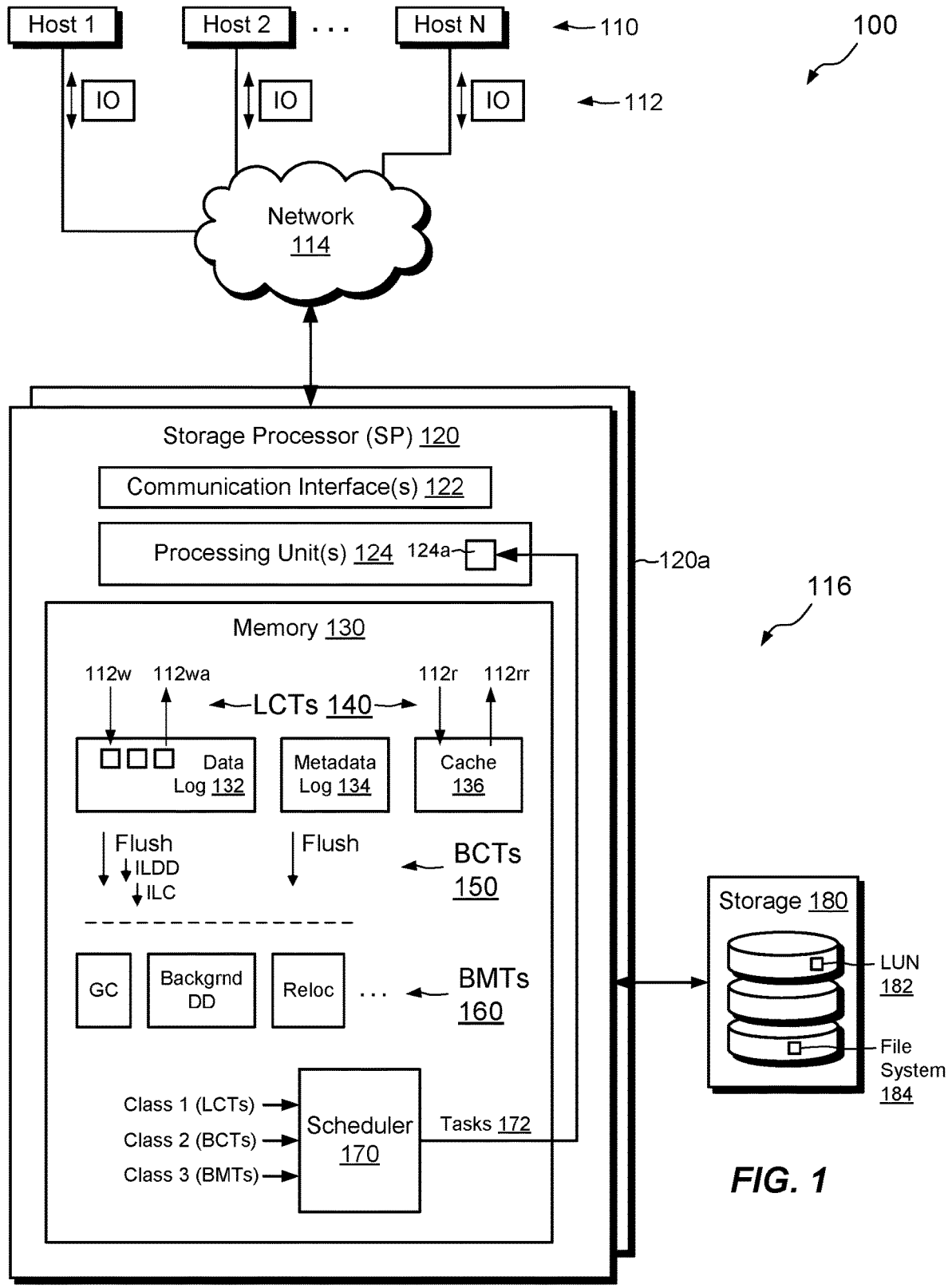
FIG. 1 is a block diagram of an example environment in which embodiments of the improved technique can be practiced.

FIG. 1 shows an example environment 100 in which embodiments of the improved technique can be practiced. Here, multiple hosts 110 access a data storage system 116 over a network 114. The data storage system 116 includes a storage processor, or "SP," 120 and storage 180, such as magnetic disk drives, electronic flash drives, and/or the like. The data storage system 116 may include multiple SPs (e.g., a second SP 120a). For example, multiple SPs may be provided as circuit board assemblies or blades, which plug into a chassis that encloses and cools the SPs. The chassis has a backplane or midplane for interconnecting the SPs, and additional connections may be made among SPs using cables. In some examples, the SP 120 is part of a storage cluster, such as one which contains any number of storage appliances, where each appliance includes a pair of SPs connected to a set of shared storage devices. In some arrangements, a host application runs directly on the SP (or SPs), such that separate host machines 110 need not be present. No particular hardware configuration is required, however, as any number of SPs may be provided, including a single SP, in any arrangement, and the SP 120 can be any type of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the SP 120 using various technologies, such as Fibre Channel, iSCSI (Internet small computer system interface), NFS (network file system), and CIFS (common Internet file system), for example. As is known, Fibre Channel and iSCSI are block-based protocols, whereas NFS and CIFS are file-based protocols. The SP 120 is configured to receive I/O requests 112 according to block-based and/or file-based protocols and to respond to such I/O requests 112 by reading or writing the storage 180.

The SP 120 includes one or more communication interfaces 122, a set of processing units 124, and memory 130. The communication interfaces 122 include, for example, SCSI target adapters and/or network interface adapters for converting electronic and/or optical signals received over the network 114 to electronic form for use by the SP 120. The set of processing units 124 includes one or more processing chips and/or assemblies, such as numerous multi-core CPUs (central processing units). A particular computing resource 124a is specifically shown, which may include one or more CPU cores, coprocessors, or the like. The memory 130 includes both volatile memory, e.g., RAM (Random Access Memory), and non-volatile memory, such as one or more ROMs (Read-Only Memories), disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, a data log 132, a metadata log 134, a cache 136, and a scheduler 170. The data log 132 is configured to receive data written by write requests 112w of the I/O requests 112 and to temporarily persist such data until it can be placed into persistent storage structures, such as LUNs (Logical UNits), file systems, virtual machine disks, and the like, which may be persisted in storage 180. In an example, the data log 132 is implemented as a circular buffer using NVMe (Non-Volatile Memory Express) technology. As is known, NVMe technology holds data persistently, i.e., even after a loss of power, but provides access speeds much faster than conventional solid state drives.

The metadata log 134 is configured to temporarily store metadata changes that accompany writes of data from the data log 132. For example, writing new data may involve both writing the data itself and writing metadata that maps or otherwise describes the data. In some examples, the metadata log 134 is implemented using NVMe.

Cache 136 is configured to store data for supporting read caching and in some cases write caching. In some examples, cache 136 is implemented in DRAM (Dynamic Random Access Memory).

Scheduler 170 is a software construct configured to schedule tasks which are run by SP 120. These may include all tasks run by SP 120 or only a subset of such tasks. In an example, scheduler 170 schedules tasks to be run by computing resource 124a, although the scheduler 170 may schedule tasks for any resource. Tasks may be scheduled in the form of threads, for example, or in other units of computerized or electronic work.

Although the use of NVMe for the data log 132 and metadata log 134 and of DRAM for the cache 136 may be preferred in certain embodiments, such use is not required, as data and metadata may also be stored using other types of media.

In example operation, the hosts 110 issue I/O requests 112 to the data storage system 116. The SP 120 receives the IO requests 112 at the communication interfaces 122 and initiates further processing. The I/O requests 112 include data reads 112r and data writes 112w. Read requests 112r include requests to read specified regions of specified data objects, such as LUN 182 and/or file system 184. Read requests may be serviced from cache 136, which may already hold the data being requested. In the event of a cache miss, SP 120 may fetch the requested data from storage 180. Either way, requested data may be returned to the requesting host 110 in a read response 112rr.

Latency of the read request may be measured as the time between arrival of the read request 112r and return of the response 112rr, which includes the requested data. Tasks associated with receiving the read requests and obtaining the requested data are thus latency-critical tasks 140 (LCTs).

As for writes, write requests 112w specify data to be written to persistent storage structures hosted by the data storage system 116, such as LUN 182 and/or file system 184. Processing of write requests 112w may include temporarily storing the data being written in the data log 132. Once the data of a write request 112w has been successfully persisted to the data log 132, the data log 132 may send an acknowledgement 112wa back to the host 110 that originated the write request 112w. Upon returning the acknowledgement 112wa, the host 110 may consider the write request 112w to be complete.

Latency of a write request may thus be measured as the time between arrival of the write request 112w and return of the acknowledgement 112wa. Tasks associated with receiving write requests 112w, persisting the specified data in the data log 132, and issuing acknowledgements 112wa may thus also be considered latency-critical tasks 140.

Although write requests 112w may be deemed complete for latency purposes upon issuance of acknowledgements 112wa, additional tasks are needed before the writes can be fully incorporated into the persistent structures, e.g., LUN 182 and/or file system 184. As shown in the figure, these tasks may include flushing the persisted data in the data log 132 to lower processing levels in the storage system, with the data eventually arriving in storage 180. In an example, flushing from the data log 132 includes performing in-line deduplication (ILDD) or in-line compression (ILC). Also, metadata changes that accompany the data writes may be arranged in the metadata log 134, and such changes may also be flushed to persistent structures in storage 180.

Although the tasks associated with flushing from the data log 132 and metadata log 132 are not latency-critical, they are nonetheless bandwidth-critical tasks 150 (BCTs), given that a failure of the SP 120 to keep up with these activities may have severe consequences. For example, if the data log 132 becomes full, it loses the ability to accept any new data, causing the data storage system to deny all write requests 112w until it can create new space in the data log 132 (e.g., by flushing accumulated data such that the space occupied by the data becomes free). Such a log-full condition causes latency to jump to an unacceptable level and should be avoided.

Thus, tasks performed by SP 120 include latency-critical tasks 140, e.g., for generally synchronous activities that require the fastest responses, and bandwidth-critical tasks 150, e.g., for generally asynchronous activities that complete the activities started by the synchronous activities. Not all activities in a storage system are latency-critical or bandwidth-critical, however. Some activities are more properly characterized as background-maintenance tasks 160 (BMTs). These include tasks that are not immediately urgent, such as garbage collection (GC), background deduplication (DD), and relocation of data, for example.

In accordance with improvements hereof, SP 120 arranges the various tasks into classes. For example, the latency-critical tasks 140 are assigned to a first class (Class 1) and the bandwidth-critical tasks 150 are assigned to a second class (Class 2). In some examples, the background maintenance tasks 160 are assigned to a third class (Class 3). The scheduler 170 selects tasks 172 from among the classes and provides selected tasks to the computing resource 124a for execution. The selector 170 preferably operates to provide latency-critical tasks 140 with prompt access to the computing resource 124a in a manner that does not starve out bandwidth-critical tasks 150 or background-maintenance tasks 160.

Figure 2:
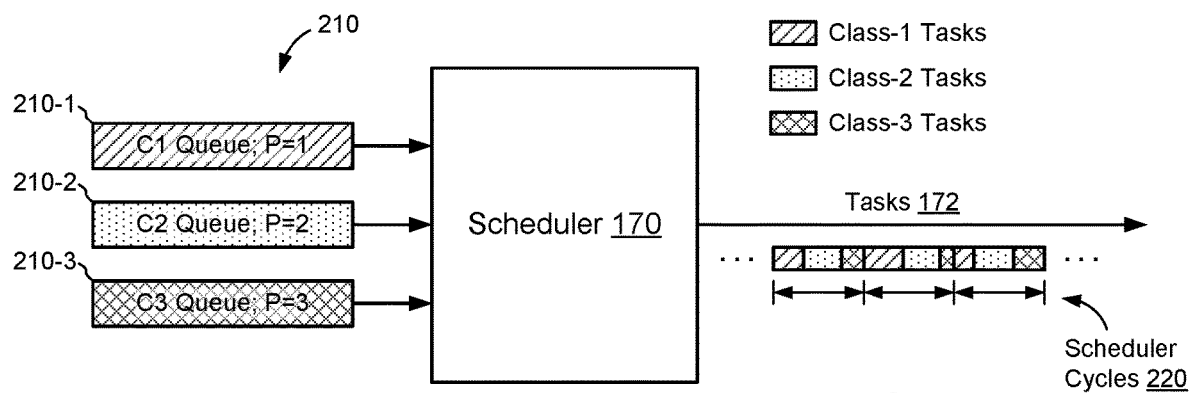
FIG. 2 is a block diagram of an example scheduler of FIG. 1 in additional detail.

FIG. 2 shows example operational details of the scheduler 170. Here, each class is associated with a respective queue 210. For example, queue 210-1 is provided for Class 1 (C1), queue 210-2 is provided for Class 2 (C2), and queue 210-3 is provided for Class 3 (C3). In an example, the queues 210 are memory-resident structures, which may be constructed as FIFOs (first in, first out). Queues 210 may contain indicators, (e.g., identifiers, descriptors, or the like) of tasks, such as threads, that are ready to be run in the respective classes. Each class has an associated priority (P), with Class 1 being priority 1, Class 2 being priority 2, and class 3 being priority 3. The priority sets the order in which tasks can be run, with tasks of higher-priority (lower-number) classes generally running before tasks of lower-priority (higher-number) classes. Each class also has an associated share, which defines an amount of processing guaranteed to be available to that share. Shares may be defined as amounts of time, e.g., numbers of microseconds, as percentages of scheduling cycles, or in any other suitable way.

As shown to the right of FIG. 2, tasks 172 are arranged in scheduling cycles 220, and scheduling cycles 220 may be repeated one after another, indefinitely. Scheduling cycles 220 may be uniform in length, such as 400 microseconds, 500 microseconds, or the like, or they may be non-uniform in length.

Within each scheduling cycle 220, C1 tasks (tasks of the highest-priority class) run first, generally until queue 210-1 is empty or until Class 1 has consumed its share. Next, C2 tasks (tasks of the next-highest-priority class) run, generally until queue 210-2 is empty or until Class 2 has consumed all of its share. If any time remains, tasks of Class 3 run.

One should appreciate that one or more of the queues 210 may be emptied in the course of running a scheduling cycle 220. For example, the C1 queue 210-1 may empty before Class 1 consumes its entire share, at which point tasks from the C2 queue 210-2 may begin to run. C2 queue 210-2 may also empty before Class 2 consumes its entire share, at which point C3 tasks from queue 210-3 may begin to run. If, in the course of running lower-priority tasks, a new, higher-priority task is received in a class that has not used up its share, the higher-priority task may run next. Thus, higher-priority tasks can bump lower-priority tasks if the associated higher-priority classes have not consumed their shares.

Although a single queue 210 is shown for each class, multiple queues per class may be provided in some examples. For instance, tasks in a single class may be provided from multiple programs or flows, each of which might maintain its own queue. Indeed, additional scheduling may be provided for prioritizing tasks within particular classes. Such scheduling may be similar to that presented here for scheduling among different classes, or it may be different. In cases where multiple queues are provided for a single class, such queues may be considered in aggregate. For example, a queue 210 may be considered empty only if all of its constituent sub-queues are empty. The description that follows assumes one queue per class, but one should appreciate that the one queue for each class may include any number of sub-queues.

In some examples, operation of the scheduler 170 is itself a task (or multiple tasks) managed by the scheduler 170. Such scheduler tasks may be assigned to Class 2, i.e., to bandwidth-critical tasks 150.

Figure 3A:
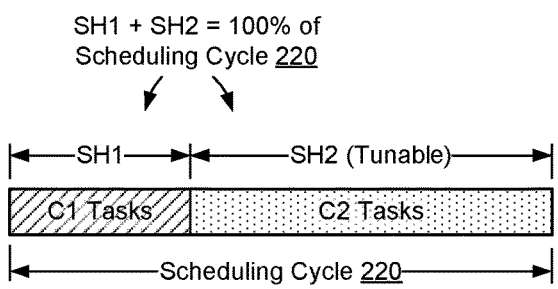
FIGS. 3a-3e are diagrams showing example allocations of access to a computing resource by different classes of tasks.

FIGS. 3a-3e show various examples of allocations of tasks within a scheduling cycle 220. In FIG. 3a, Class 1 has a share SH1 and Class 2 has a share SH2. Together, these shares make up the entirety, i.e., 100%, of the scheduling cycle 220. For example, scheduling cycle 220 may be 500 microseconds long, with SH1 being 200 microseconds and SH2 being 300 microseconds. In this example, Class 3 has a share of zero, meaning that Class 3 is not guaranteed any share of the scheduling cycle 220. As shown, C1 tasks run for the entire share SH1 of Class 1, and they run before any C2 tasks begin. After the share SH1 runs out, C2 tasks begin to run, and they continue running for the remainder of the scheduling cycle 220. No C3 tasks are run in this example.

Figure 3B:

FIG. 3b is similar to FIG. 3a, except that C1 tasks finish before the share SH1 is fully consumed. For example, queue 210-1 may have emptied. In this case, C2 tasks begin running and continue running for the remainder of the scheduling cycle 220. Here, C2 tasks are allowed to exceed the share SH2 because Class 3 has zero share and the C2 queue 210-2 is not empty.

Figure 3C:
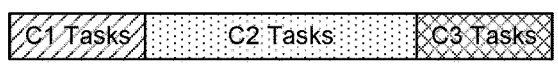

FIG. 3c is similar to FIG. 3b, except that C2 tasks run out (C2 queue 210-2 becomes empty) before the scheduling cycle 220 ends. Assuming no new C1 tasks have arrived, i.e., that there are no higher-priority tasks pending, C3 tasks can start running, and they do so in this case until the end of the scheduling cycle 220.

Figure 3D:

FIG. 3d shows an example in which the C1 queue 210-1 initially empties but then new C1 tasks arrive before the end of the scheduling cycle 220. As shown, initial C1 tasks run first and continue running until the C1 queue 210-1 empties (prior to consumption of SH1), at which point C2 tasks begin to run. Shortly later, one or more additional C1 tasks arrive in C1 queue 210-1. As C1 tasks take priority over C2 tasks and SH1 is not fully consumed, C1 tasks run until the C1 queue 210-1 is emptied or SH1 is fully consumed, whichever comes first, at which point C2 tasks resume. Eventually, C2 queue 210-2 runs out of tasks. Assuming C1 queue 210-1 is also empty, C3 tasks can now run, and they do so until the end of the scheduling cycle 220.

Figure 3E:
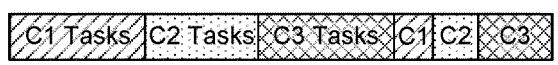

FIG. 3e shows another example. Here, C1 tasks run first until the C1 queue 210-1 empties, at which point C2 tasks begin running. The C2 queue 210-2 also empties, at which point C3 tasks begin running. Later in the same cycle, the C1 queue 210-1 and the C2 queue 210-2 both receive additional tasks. As Class 1 has higher priority, the new C1 tasks run until they are exhausted or until SH1 is fully consumed, whichever comes first. Then C2 tasks resume until those tasks are exhausted. C3 tasks then consume the remainder of the scheduling cycle 220.

Figure 4:
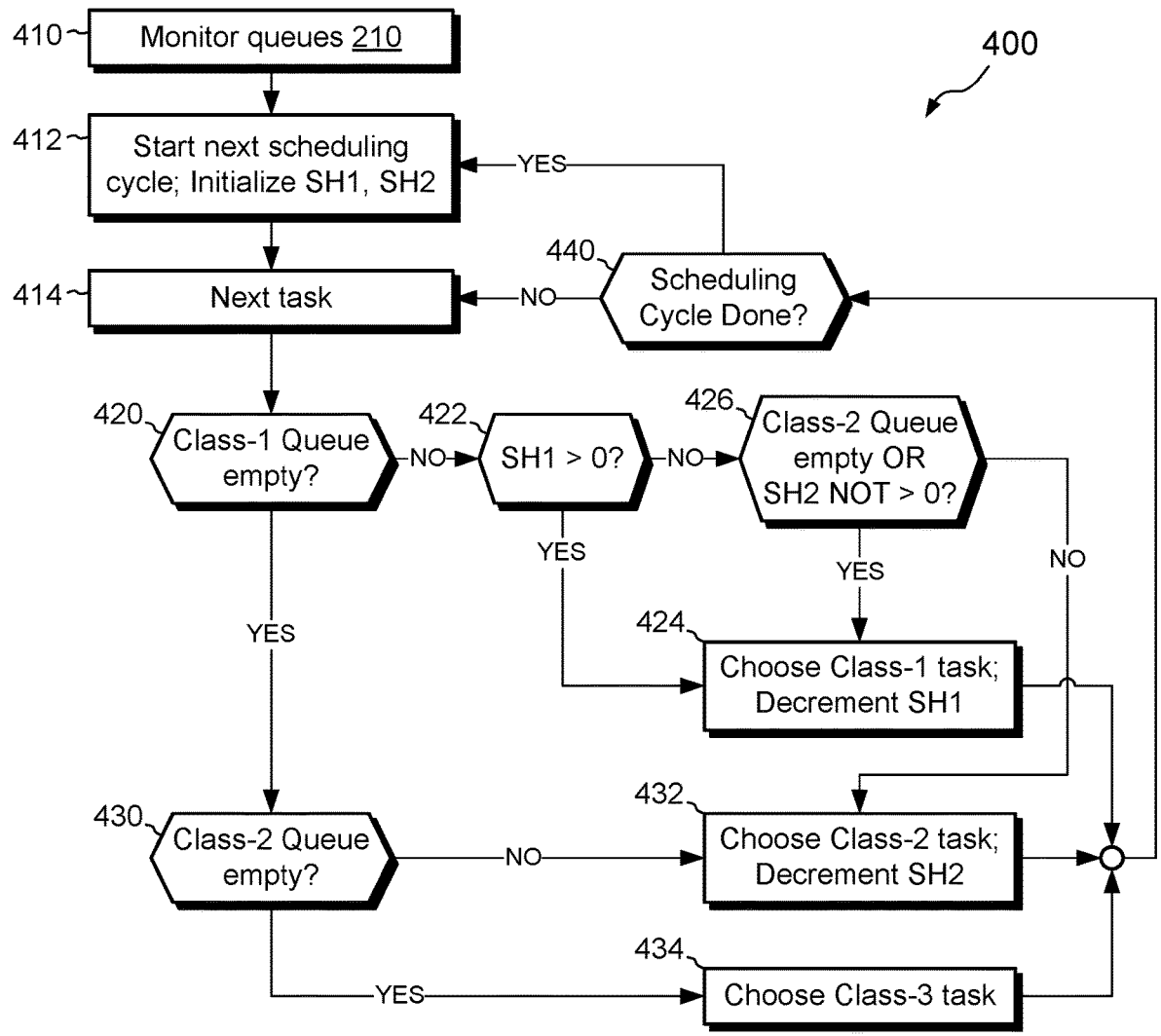
FIG. 4 is a flowchart showing an example method of allocating tasks by the example scheduler of FIG. 2.

FIG. 4 shows an example method 400 of selecting tasks to be run on a computing resource, such as resource 124a in FIG. 1. Method 400 may be performed, for example, by the scheduler 170. The depicted acts of method 400 provide one way of achieving desired functionality. One should appreciate, though, that similar results can be achieved using different acts, or by varying the order of acts performed. The particular arrangement of acts shown are thus intended to be illustrative rather than limiting. Further, such acts may be encoded in software, hardware, or firmware. They may also be realized in a computer program product, such as a non-transitory computer readable medium.

At 410, method 400 monitors the queues 210. For example, each queue 210 is monitored to determine whether it is empty. In some examples, queue lengths may also be monitored. For example, as described more fully below, queue length of one or more of the queues 210 may be used as feedback in determining how to set the shares SH1 and SH2 of the first and second classes.

At 412, a new scheduling cycle 220 begins. Starting the scheduling cycle 220 may involve initializing shares SH1 and SH2, e.g., by setting them to established values. Non-limiting examples of these values may be 40% (200 microseconds) for SH1 and 60% (300 microseconds) for SH2.

At 414, the method 400 begins the work of selecting a new task. At 420, scheduler 170 checks whether the C1 queue 210-1, i.e., the queue for latency-critical tasks, is empty.

If the C1 queue is empty, operation proceeds to 430, whereupon the scheduler 170 checks whether the C2 queue 210-2, i.e., the queue for bandwidth-critical tasks, is empty. If so, operation proceeds to 434, whereupon the scheduler chooses a C3 task as the next task to be run. Here, a C3 task is chosen only because there are no waiting C1 tasks or C2 tasks. Of course, if the C3 queue is also empty, no task is selected as no tasks are ready to be run.

Returning to 430, if the C2 queue 210-2 is not empty, operation proceeds instead to 432, whereupon the scheduler 170 choses a C2 task, i.e., a task from the C2 queue 210-2, as the next task to be run by the computing resource 124a. The scheduler 170 also decrements the C2 share SH2, e.g., based on the amount of time needed to run the selected C2 task. In some examples, decrementing SH2 takes place after the selected C2 task has run, i.e., once the runtime of the selected C2 task has been determined.

Returning now to 420, if the C1 queue 210-1 is not empty, operation proceeds instead to 422, whereupon the scheduler 170 checks whether SH1 is positive, meaning that Class 1 still has remaining share. If so, the scheduler 170 proceeds to 424 and chooses a C1 task as the next task to be run. The scheduler 170 consequently decrements the C1 share SH1 based on the amount of time needed to run the selected C1 task.

If at 422 SH1 is not positive, meaning that Class 1 has no remaining share in the current scheduling cycle 220, operation proceeds instead to 426, whereupon the scheduler 170 determines whether the C2 queue 210-2 is empty or whether the C2 share SH2 is exhausted. If either is true, there is no need to run a C2 task and the scheduler 170 proceeds to 424, choosing a C1 task and decrementing SH1. However, if the C2 queue 210-2 is not empty and the C2 share SH2 is not exhausted, then Class 2 has a claim to additional processing and operation proceeds to 432, where a C2 task is chosen and SH2 is decremented.

After selection of a task, whether it be at 424, 432, or 434, operation proceeds to 440. Here, the scheduler 170 whether the current scheduling cycle 440 is complete, e.g., whether the cycle time (e.g., 500 microseconds) has expired. If not, operation proceeds to 414 for choosing a new task in the current scheduling cycle 220. Operation then continues as before, for selecting a next task, and such operation repeats until, upon returning to 440, the scheduling cycle 220 is done, at which point operation returns to 412, where a next scheduling cycle is started. Shares SH1 and SH2 are reinitialized to properly account for share usage in the new scheduling cycle. Operation then proceeds as previously described, and such operation can continue indefinitely.

Figure 5:
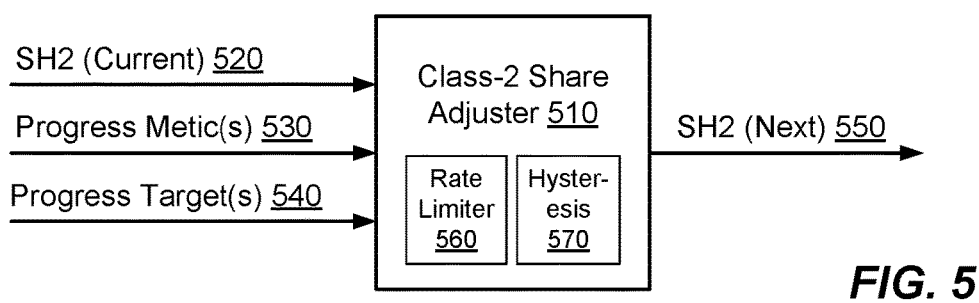
FIG. 5 is a block diagram showing an example arrangement for adaptively changing share allocations.

FIG. 5 shows an example arrangement for adaptively varying the share SH2 of the second class based on feedback. As previously stated, the share of Class 3 may be zero. A consequence of this fact, where there are only three classes, is that the sum of shares SH1 and SH2 amount to 100% of the scheduling cycle 220.

It has been recognized that bandwidth-critical tasks 150 may be used as a sole determinant for allocating shares to the various classes. For example, sustained progress in the data storage system 116 depends on keeping up with these bandwidth-critical tasks 150. If progress in performing these tasks falls short, for example if the data log 132 (FIG. 1) fills up, the system may become incapable of accepting new write requests, a scenario which should be avoided. By setting the share SH2 to a level that enables bandwidth-critical task 150 to keep up with arriving data, the share SH1 of latency-critical tasks becomes dependent on the share SH2, such that SH1 equals the total duration of the scheduling cycle 220 minus SH2, i.e., SH1=100%−SH2.

As the driver of share allocations, SH2 may be adjusted to account for changes in system load and/or operation, with the share SH1 changing in response to the changes in SH2. To this end, the scheduler 170 may include a class-2 share adjuster 510, which automatically adjusts the share SH2. For example, adjuster 510 may receive as input the current value 520 of SH2, as well as one or more progress metrics 530 and one or more progress targets 540. The adjuster 510 may provide as output a next value 550 of SH2, which may be different from the current value 520.

One of the progress metrics 530 may include a measure of fullness of the data log 132, e.g., whether the data log 132 is 70% full, 90% full, or the like. A corresponding progress target 540 for the data log 132 represents a desired or optimal level of fullness, such as 80%. In an example, the adjuster 510 compares the metric 530 with the corresponding target 540 and adjusts SH2 accordingly. For example, if the current fullness of the data log 132 is 70% and the target fullness is 80%, then the adjuster 510 may decrease the value of SH2 in an effort to bring the actual fullness closer to 80%. For example, reducing SH2 slows down flushing and allows the data log 132 to become more full. Similarly, if the current fullness of the data log 132 is 90% and the target fullness is 80%, then the adjuster 510 increases the value of SH2, again to bring the actual fullness closer to 80%.

In some examples, the adjuster 510 includes a rate limiter 560 and/or hysteresis 570. The rate limiter 560 limits the amount of change that the adjuster 510 can make at one time, and thus tends to smooth and stabilize operation. For example, the adjuster 510 may operate in steps, generating a new value 550 of SH2 on some regular basis, such as every half second, every second, or the like. In this case, the rate limiter 560 limits that change that can be made at each step. Hysteresis 570 also helps to smooth and stabilize operation, e.g., by being more conservative when reducing SH2 than it is when increasing SH2. Thus, decreases in SH2 may be made more slowly than increases. This may involve requiring greater differences between metrics 530 and targets 540 in the negative direction than are required in the positive direction to bring about the same degree of change in SH2.

Other factors besides fullness of the data log 132 may contribute to changes in SH2. These may include, for example, fullness of the metadata log 134. They may also include the status of any other bandwidth-critical program or operation. In general, any bandwidth-critical program or operation that is falling behind can raise SH2. But decreases in SH2 are generally by consensus. In some examples, queue length of one or more of the queues 210 may itself be used as feedback in determining how to set the share SH2.

Of course, any change in SH2 results in an equal and opposite change in SH1. Thus, increasing the share SH2 of bandwidth-critical tasks 150 reduces the share of latency-critical tasks 140. Reduction in SH1 may have a slight throttling effect in I/O ingestion, which further helps to allow bandwidth-critical task to catch up if they are falling behind.

It is believed that allowing multiple shares to be independently adjustable would result an excessive complexity and possible instability. By providing SH2 as a single adjustable parameter, a simple and elegant solution is provided for balancing the distribution of tasks in the data storage system 116.

Figure 6:
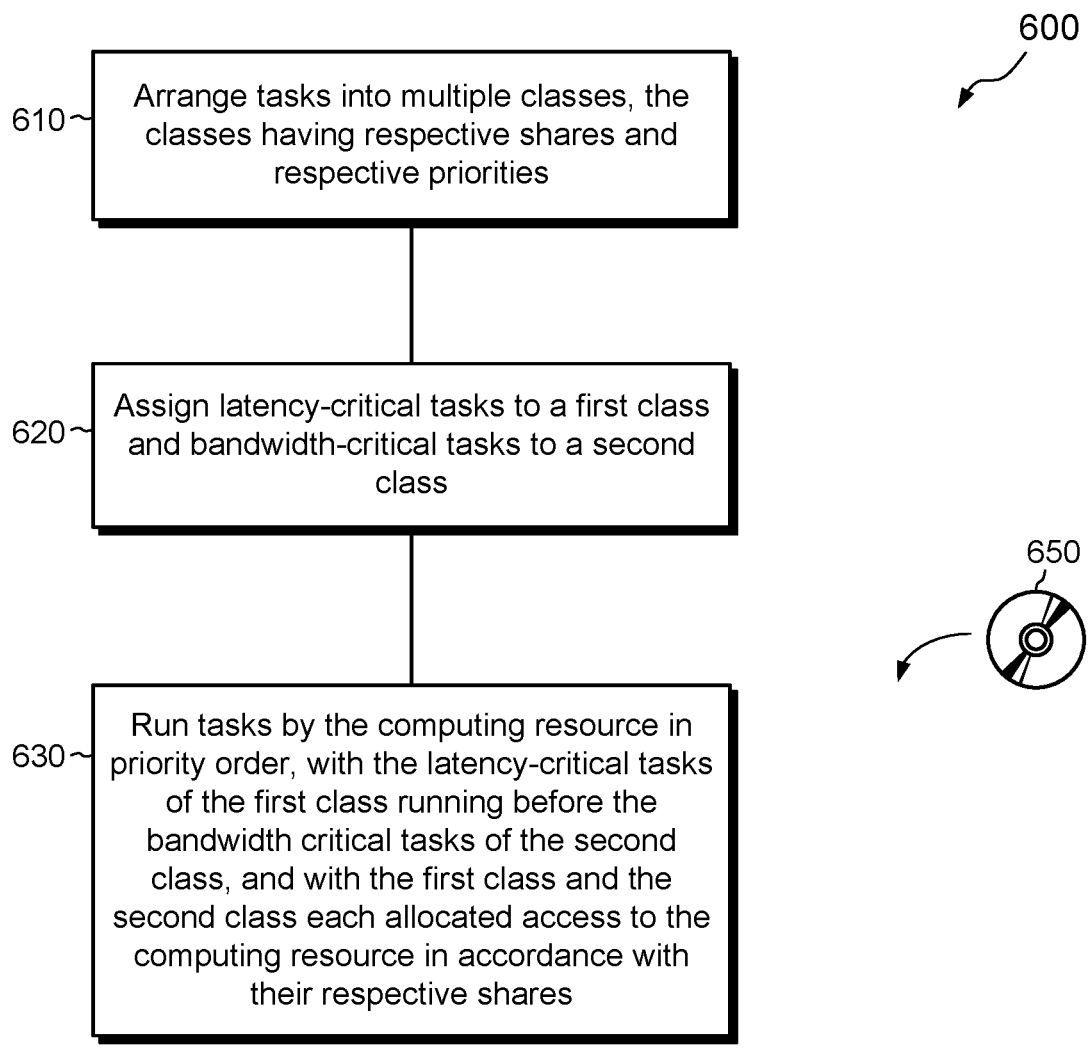
FIG. 6 is a flowchart showing an example method of scheduling tasks to be run on a computing resource in a data storage system.

FIG. 6 shows an example method 600 that may be carried out in connection with the environment 100 and provides a summary of some of the topics described above. The method 600 is typically performed, for example, by the software constructs described in connection with FIG. 1, which reside in the memory 130 of the storage processor 120 and are run by the set of processors 124. The various acts of method 600 may be ordered in any suitable way. Accordingly, embodiments may be constructed in which acts are performed in orders different from that illustrated, which may include performing some acts simultaneously.

At 610, tasks are arranged into multiple classes, such as Class 1 and Class 2 (and in some examples Class 3), with the classes having respective shares, e.g., SH1 and SH2, and respective priorities.

At 620, latency-critical tasks 140 are assigned to a first class and bandwidth-critical tasks 150 are assigned to a second class. In some examples, background-maintenance tasks 160 may be assigned to a third class.

At 630, tasks are run by resource 124a in priority order, with latency-critical tasks 140 of the first class running before bandwidth critical tasks 150 of the second class, and with the first class and the second class each allocated access to the computing resource 124a in accordance with their respective shares, SH1 and SH2.

An improved technique has been described for scheduling access to a resource. The technique arranges tasks into multiple classes, where each class has a respective share and a respective priority. The share of a class sets an amount of access allocated to the class, and the priority sets an order in which the class can use its share, with higher priority classes getting access before lower-priority classes. The technique assigns latency-critical tasks 140, such as synchronous I/O tasks, to a first class having the highest priority and assigns bandwidth-critical tasks 150, such as background I/O processing, to a second class having lower priority.

Having described certain embodiments, numerous alternative embodiments or variations can be made. For example, embodiments have been described that involve three classes. However, other embodiments may involve as few as two classes or greater than three classes.

Also, although embodiments have been described in which certain tasks are assigned to respective classes, such assignments need not be permanent. For example, if it is determined that a particular task assigned to the third class is being starved out in a manner that might become critical, that task may be reassigned, at least temporarily, to the second class of bandwidth-critical tasks 140.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 650 in FIG. 6). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should not be interpreted as meaning "based exclusively on" but rather "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of scheduling tasks to be run on a computing resource in a data storage system, comprising:
arranging tasks into multiple classes, the classes having respective shares and respective priorities;
assigning latency-critical tasks to a first class and bandwidth-critical tasks to a second class; and
running tasks by the computing resource in priority order, with the latency-critical tasks of the first class running before the bandwidth critical tasks of the second class, and with the first class and the second class each allocated access to the computing resource in accordance with their respective shares,
wherein the method further comprises running multiple scheduling cycles in succession, wherein the first class and the second class are allocated access to the computing resource in accordance with their respective shares within the scheduling cycles,
wherein the latency-critical tasks assigned to the first class include I/O request tasks for receiving and responding to I/O requests but not background I/O tasks for incorporating data received in I/O write requests into persistent storage structures, and wherein bandwidth-critical tasks assigned to the second class include background I/O tasks for incorporating data received in I/O write requests into persistent storage structures but not I/O request tasks for receiving and responding to I/O requests, and
wherein the act of scheduling tasks is itself a task and is assigned to the second class.

2. The method of claim 1, wherein the classes further include a third class for additional background tasks, the third class having a lowest priority.

3. The method of claim 2, wherein the shares of the first class and the shares of the second class together account for 100% of a scheduling cycle, with a share of the third class being zero.

4. The method of claim 3, wherein tasks in the third class are run in response to both the first class and the second class having no tasks ready to be run.

5. The method of claim 3, wherein the share of the second class is provided as an adjustable parameter, with the share of the first class being dependent upon the share of the second class.

6. The method of claim 5, wherein the share of no other class besides the second class is an adjustable parameter.

7. The method of claim 5, further comprising monitoring progress of tasks in the second class and changing the share of the second class in response to detecting that the progress differs from a target level.

8. The method of claim 7, wherein changes in the share of the second class are rate-limited.

9. The method of claim 2, further comprising reassigning a set of tasks in the third class to the second class in response to determining that the set of tasks has become critical.

10. The method of claim 1, wherein a lower-priority class exceeds its allocated share within a scheduling cycle in response to no higher-priority class having any tasks ready to be run.

11. A computerized apparatus, comprising control circuitry that includes a set of processing units coupled to memory, the control circuitry constructed and arranged to:
arrange tasks into multiple classes, the classes having respective shares and respective priorities;
assign latency-critical tasks to a first class and bandwidth-critical tasks to a second class; and
run tasks by a computing resource in priority order, with the latency-critical tasks of the first class running before the bandwidth critical tasks of the second class, and with the first class and the second class each allocated access to the computing resource in accordance with their respective shares,
wherein the control circuitry is further constructed and arranged to run multiple scheduling cycles in succession, wherein the first class and the second class are allocated access to the computing resource in accordance with their respective shares within the scheduling cycles,
wherein the latency-critical tasks assigned to the first class include I/O request tasks for receiving and responding to I/O requests but not background I/O tasks for incorporating data received in I/O write requests into persistent storage structures, and wherein bandwidth-critical tasks assigned to the second class include background I/O tasks for incorporating data received in I/O write requests into persistent storage structures but not I/O request tasks for receiving and responding to I/O requests, and
wherein scheduling of tasks is itself a task and is assigned to the second class.

12. A computer program product including a set of non-transitory, computer-readable media having instructions which, when executed by control circuitry of a computerized apparatus, cause the computerized apparatus to perform a method of scheduling tasks to be run on a computing resource, the method comprising:
arranging tasks into multiple classes, the classes having respective shares and respective priorities;
assigning latency-critical tasks to a first class and bandwidth-critical tasks to a second class; and
running tasks by the computing resource in priority order, with the latency-critical tasks of the first class running before the bandwidth critical tasks of the second class, and with the first class and the second class each allocated access to the computing resource in accordance with their respective shares,
wherein the method further comprises running multiple scheduling cycles in succession, wherein the first class and the second class are allocated access to the computing resource in accordance with their respective shares within the scheduling cycles,
wherein the latency-critical tasks assigned to the first class include I/O request tasks for receiving and responding to I/O requests but not background I/O tasks for incorporating data received in I/O write requests into persistent storage structures, and wherein bandwidth-critical tasks assigned to the second class include background I/O tasks for incorporating data received in I/O write requests into persistent storage structures but not I/O request tasks for receiving and responding to I/O requests, and
wherein the act of scheduling tasks is itself a task and is assigned to the second class.

13. The computer program product of claim 12, wherein the classes further include a third class for additional background tasks, the third class having a lowest priority.

14. The computer program product of claim 13, wherein the shares of the first class and the shares of the second class together account for 100% of a scheduling cycle, with a share of the third class being zero, and wherein tasks in the third class are run in response to both the first class and the second class having no tasks ready to be run.

15. The computer program product of claim 12, wherein the share of the second class is provided as an adjustable parameter, with the share of the first class being dependent upon the share of the second class, and wherein the share of no other class besides the second class is an adjustable parameter.

16. The method of claim 1, wherein the multiple tasks further include a third class for additional background tasks, wherein the share of the second class is provided as an adjustable parameter, with the share of the first class depends solely upon the share of the second class.

17. The method of claim 1, wherein running tasks by the computing resource in priority order includes:
running first tasks of the first class within a scheduling cycle responsive to the first class having shares remaining in the scheduling cycle; and
running second tasks of the second class within the scheduling cycle responsive to second class having shares remaining in the scheduling cycle and there being no pending first tasks of the first class with shares of the first class remaining in the scheduling cycle.

18. The method of claim 17, wherein the classes further include a third class for additional background tasks, the third class having a lowest priority, and wherein running tasks by the computing resource in priority order further includes:
running third tasks of the third class within the scheduling cycle responsive to there being (i) no pending first tasks of the first class with shares of the first class remaining and (ii) no pending second tasks of the second class with shares of the second class remaining.

* * * * *